US012719742B1

(12) United States Patent
Formento et al.

(10) Patent No.: US 12,719,742 B1
(45) Date of Patent: Aug. 25, 2026

(54) AUTOMATED MULTI-REGION APPLICATION RECOVERY

(71) Applicant: Amazon Technologies, Inc., Seattle, WA (US)

(72) Inventors: John Paul Formento, Buckley, WA (US); Danilo Ayar Duran, Seattle, WA (US); Christopher L. Cmolik, Santa Monica, CA (US); Shanshan Li, Chantilly, VA (US); Mikhail Ivanovich Golovnykh, Lake Oswego, OR (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/979,487

(22) Filed: Dec. 12, 2024

(51) Int. Cl.
*H04L 41/06* (2022.01)
*H04L 41/0604* (2022.01)
*H04L 41/0654* (2022.01)

(52) U.S. Cl.
CPC ...... *H04L 41/0654* (2013.01); *H04L 41/0622* (2013.01); *H04L 41/0627* (2013.01)

(58) Field of Classification Search
None
See application file for complete search history.

(56) References Cited

U.S. PATENT DOCUMENTS

2005/0036485 A1* 2/2005 Eilers .................... H04L 49/552 370/230.1

* cited by examiner

*Primary Examiner* — Cai Y Chen
(74) *Attorney, Agent, or Firm* — Knobbe, Martens, Olson & Bear, LLP

(57) ABSTRACT

A recovery orchestrator system receives a recovery plan, which may be used for a hosted-computing environment. The recovery plan includes multiple steps. The recovery orchestrator system receives monitoring metrics. The recovery orchestrator system executes the recovery plan based on the monitoring metrics. The recovery orchestrator system executes steps from the recovery plan in multiple fault domains. The recovery orchestrator system monitors the status of the execution of the recovery plan and provides the status update to a computing device.

20 Claims, 6 Drawing Sheets

AUTOMATED MULTI-REGION APPLICATION RECOVERY

BACKGROUND

Software applications execute in a computing environment. The software applications can rely on databases and other software applications to execute. The computing environment can be a hosted computing environment with one or more rapidly provisioned and/or released computing resources. The computing resources may include hardware computing, networking, and/or storage devices configured with specifically configured computer executable instructions. The software applications can experience issues, such as, computing environment issues, hardware failures, network latency, and/or database failures. Accordingly, application recovery is necessary to ensure that software applications can recover from these issues. However, many existing methods for application recovery include many manual steps, which can have limited flexibility and/or be static.

BRIEF DESCRIPTION OF THE DRAWINGS

Various features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1A:
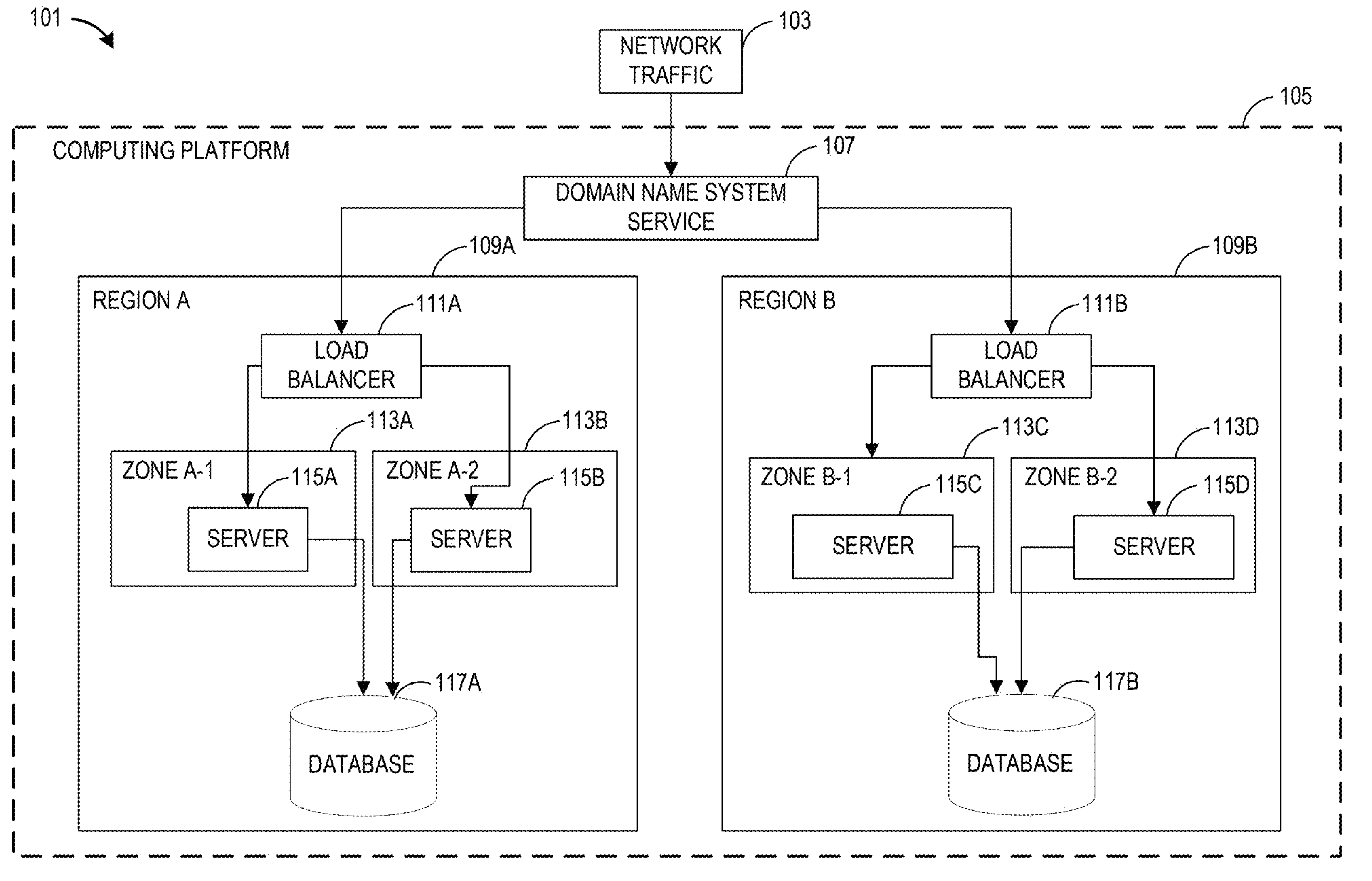
FIG. 1A is a schematic block diagram depicting an illustrative environment for application recovery.

Often software applications can be multi-region. For example, one region can be the primary region for normal operation of a software application. Another region can have a replica of the software application that can be used as a recovery target when something goes wrong. Recovering from another region can be technically challenging. As described above, existing methods for application recovery include many manual steps, which can have limited flexibility and/or be static. For example, during a failure event, humans are required to make decisions regarding whether application recovery should take place and/or the manner of application recovery. Typically, the process of deciding whether to perform application recovery is with very limited metrics or not metrics at all. Once an application recovery decision has been made, an administrator is required to carry out a graceful switchover/ungraceful failover process (such as 20 to 30 steps) to modify configurations and/or execute commands. Typically, the operator performing the steps follows the steps exactly in a static manner. In some cases, multiple applications must be recovered. For example, there can be a Site Reliability Engineering (SRE) team that is responsible for orchestrating recovery across multiple applications in an enterprise. To orchestrate recovery, the SRE team has to work with multiple application teams and ensure that each team follows the same recovery approach and operates out of the same region.

Generally described, aspects of the present disclosure are directed towards solutions that can enable automated or partially automated multi-domain application recovery. As described herein, a recovery orchestrator system can receive a recovery plan. The recovery plan can include a recovery configuration and multiple steps. In some cases, the recovery orchestrator system can receive monitoring metrics. The recovery orchestrator system can, based on the monitoring metrics and, in some cases, approval, execute the recovery plan. The recovery orchestrator system can execute steps from the recovery plan in multiple fault domains in a dynamic manner, which can be based on the recovery configuration. For example, based on the recovery configuration, the recovery orchestrator system can initiate a graceful switchover with no data loss but, if the graceful switchover is deemed to be unlikely to succeed in a timely manner, the system can automatically proceed with an ungraceful failover that may result in data loss. The recovery orchestrator system can monitor the status of the execution of the recovery plan and provide the status update to a computing device. The recovery orchestrator system can enable dynamic application recovery that can satisfy client recovery time objectives.

The systems and methods described herein may improve application recovery technology. As described herein, existing methods for application recovery include many manual, static steps with little flexibility. The existing methods can result in undesirable outcomes, such as data loss and/or a failure to meet client recovery time objectives. As described herein, a recovery plan received by a recovery orchestrator system can include recovery configuration and multiple steps. With the recovery configuration, the recovery orchestrator system can perform dynamic operations such as, but not limited to, executing a graceful switchover with no data loss but, if the switchover is deemed to be unlikely to succeed in a timely manner, the system can automatically proceed with an ungraceful failover that may result in data loss. As another example, the recovery configuration can specify, for autoscaling purposes, the computing capacity that a target fault domain should have before switching over to the target fault domain. The recovery orchestrator system can cause autoscaling to occur, monitor the capacity following autoscaling, and cause the switchover to occur once the capacity satisfies a threshold. The systems and methods described herein can therefore enable dynamic application recovery that can satisfy client recovery time objectives in an efficient matter. Moreover, the systems and methods described herein can improve the functioning of computers since software applications running on computer hardware can recover more efficiently. Accordingly, the systems and methods described herein may improve application recovery technology.

Moreover, the solutions described herein may be inextricably tied to computer technology. For example, as described herein, ungraceful failing over/graceful switching over databases, autoscaling computing capacity, and/or shifting network traffic via DNS services are operations that are inextricably tied to computer technology. Thus, the systems and methods described herein are inextricably tied to computer technology.

As used herein, a "region" can refer to an area, such as, but not limited to, a geographic area. Each region can have multiple, isolated data centers that can be referred to as zones.

As used herein, a "fault domain" can refer to a logical grouping of a computer environment that can be negatively affected together. Example fault domains are regions and zones. A first fault domain can refer to a first data center and a second fault domain can refer to a second data center. In some embodiments, a first fault domain can refer to a first computing device and a second fault domain can refer to a second computing device.

As used herein, a "graceful" action/plan can refer to an action/plan (such as a database switchover or a recovery plan) that is configured to execute without disruptions, such as by executing so as not to result in data loss. In contrast, as used herein, an "ungraceful" action/plan can refer to an action/plan (such as a database failover or a recovery plan) that is configured to execute with potential disruptions, such as by executing in a manner that may result in data loss.

Turning to FIG. 1A, a schematic block diagram is shown depicting an illustrative environment 101 for application recovery. The environment 101 can include network traffic 103 and a computing platform 105. The computing platform 105 can include a domain name system (DNS) service 107, multiple regions 109A, 109B, and one or more databases 117A,117B. Each region 109A, 109B can include a load balancer 111A, 111B and zones 113A, 113B, 113C, 113D. Zones can be multiple, isolated locations within each region. Each zone 113A, 113B, 113C, 113D can include one or more servers 115A, 115B, 115C, 115D. The environment 101 of FIG. 1A illustrates an application recovery implementation. Other environment configurations and application recovery implementations are possible and within the scope of the present disclosure.

Within FIG. 1A, the application stack can be replicated. For example, the second region 109B, Region B, can be a replica of the first region 109A, Region A. The second database 117B can be a replica of the first database 117A. An active/passive recovery model can be used in the environment 101. As described herein, a manual process can require that an administrator decide whether application recovery should occur. During an application failure of the first region 109A, Region A, an administrator may be required to manually update configuration for the DNS service 107 that shifts the network traffic from the first region 109A to the second region 109B. Similarly, the administrator may be required to update application configuration to switch over to the second database 117B. As described herein, additional application recovery environments and uses cases are possible.

One such use case that can benefit from the recovery orchestration techniques and systems described herein is a multi-region (such as a two region) active/passive use case. In such a use case, the client can operate an application that relies on hosted computing resources such as hosted server instances, a distributed database system, and a DNS service. The environment 101 of FIG. 1A can follow a two region active/passive model. The application can normally run in a first region (such as the first region 109A, Region A, of FIG. 1A) and a desired result can be to fail over to a second region (such as the second region 109B, Region B, of FIG. 1A). The desired setup can be a warm standby active/passive architecture. The two replicas of the application are deployed into the two regions. The passive replica (such as the second region 109B, Region B, of FIG. 1A) can be configured to run at minimal computing capacity. The servers can be configured to communicate with the storage (such as a database) in the same region. The distributed database for the application can be configured to accept writes in only the active region. The DNS service can route traffic into only the active region.

For a multi-domain active/passive use case, a non-limiting desired standard operating procedure ("SOP") for graceful switching-over/ungraceful failing-over into a passive domain (such as region) is outlined in Table 1 below.

TABLE 1

| |
|---|
| Start increasing hosted computing capacity in the passive fault domain. |
| Issue an approval request to a decision maker (such as a Vice President (VP)). |
| Wait until 1) the passive fault domain has 90% of the capacity of the active fault domain, and 2) the decision maker grants the approval. |
| Note: If the application is fully down in the primary fault domain, the system/operator may choose to override the waiting. |
| Initiate a maintenance page/notice in the active fault domain. |
| Note: This step involves a dynamic code execution invocation that performs mutating operations in the impaired fault domain, which may or may not work. The system/operator may choose to override waiting on this step. |
| Trigger a fencing mechanism in the active fault domain. Fencing means that the application in the fault domain should no longer receive additional requests. |
| Note: This step involves a dynamic code execution invocation that performs mutating operations in the impaired fault domain, which may or may not work. The system/operator may choose to override waiting on this step. |
| Execute a distributed database switchover (no data loss). |
| Note: If the database switchover is deemed to be unlikely to succeed, or the switchover operation gets stuck, the system/operator may execute a database failover instead (this may result in data loss). |
| Issue an approval request to the database team. |
| Wait until 1) database validation scripts validate database cluster readiness and 2) the database team grants the approval. |
| Perform DNS failover to shift traffic into what was the passive fault domain. |
| Verify that 1) at least 90% of the original traffic volume is hitting the new active fault domain and 2) the alarms are healthy. |

In the multi-domain active/passive use case, the same switchover procedure can be used to switch back into the first fault domain after the failure event is over.

Another use case can be a multi-domain (such as a two region) active/active use case, which can benefit from the recovery orchestration techniques and systems described herein. In such a use case, the client can operate an application that relies on hosted computing resources, a computing platform scaling service, a messaging queue service, a distributed database system, and a DNS service. Some clients can prefer a multi-domain active/active architecture for redundancy and availability reasons. In a two fault domain active/active use case, two replicas of the application are deployed into two fault domains (such as a first region and a second region) and each fault domain receives roughly equal amounts of traffic. However, only a primary database cluster in one fault domain (such as the first region) can accept writes. For reads, the application can use the database cluster in the local fault domain (such as the first region or the second region). For writes, the application uses the primary database cluster (such as the database in the first region) that may or may not be in the local fault domain. There can be three SOPs for the multi-domain active/active use case.

For the multi-domain active/active use case, a non-limiting desired data layer graceful switchover/ungraceful failover SOP is outlined in Table 2 below. The application owner can desire this SOP when either 1) the application's primary database cluster is impaired, or 2) there is a widespread impairment in the primary fault domain (such as impairment of the hosted resources in a region).

TABLE 2

| |
|---|
| Application owner/delegate selects the recovery action - failover or switchover - based at least on database replication lag. |
| Start the distributed database switchover/failover into the secondary fault domain. |
| Note: If database switchover is stuck, the system/operator may switch to the failover instead. |
| Update application recovery routing control state to point the database write endpoint into the database in the secondary fault domain. |
| Wait until database validation scripts validate database cluster readiness. |

For the multi-domain active/active use case, a non-limiting desired computing layer fault domain deactivation SOP is outlined in Table 3 below. The application owner can desire this SOP when there are events in the fault domain(s) (such as failure events related to the hosted resources in the region(s)). With this SOP, the application owner desires to scale up the capacity in the healthy fault domain and shift traffic away from the unhealthy fault domain.

TABLE 3

| |
|---|
| Start increasing capacity in the healthy fault domain. |
| Wait until the capacity in the healthy fault domain has increased by at least 50%. |
| Update application recovery routing control state to shift traffic away from the fault domain. |
| Verify that 1) the active fault domain has 2x the original capacity, 2) the alarms are healthy, and 3) all traffic is going into the healthy fault domain. |

For the multi-domain active/active use case, a non-limiting desired computing layer fault domain activation SOP is outlined in Table 4 below. With this SOP, the application owner desires to shift traffic back into the fault domain that was previously deactivated.

TABLE 4

| |
|---|
| Scale the fault domain that is being activated to at least 50% of the capacity of the other fault domain. |
| Update application recovery routing control state to shift traffic back into the fault domain. |
| Verify that 1) the alarms are healthy, and 2) traffic is hitting both fault domains. |

Another use case can be a multi-application recovery use case, which can benefit from the recovery orchestration techniques and systems described herein. An SRE team can be responsible for orchestrating recovery across multiple applications in an enterprise. The SRE team is responsible for understanding application criticality and putting the applications into tiers. Then with the highly critical applications the SRE team has completed a dependency analysis to see which applications need to be recovered together when enacting a recovery.

In this use case, to orchestrate recovery the SRE team has to work with five different application teams and ensure that each application follows the same recovery approach (active/passive) and operates out of the same fault domain.

To accomplish the goal of orchestrating recovery across these five applications, the following order of application recovery needs to take place: 1) App D; 2) App C; 3) App A; 4) App B; and 5) App F. However, App D and App C can be recovered at the same time since they are both foundational. In contrast, Apps A, B, and F have to be recovered sequentially as they all depend on Apps D and C, and each specific subsequent application has specific hard dependencies. In particular, the order of application recovery with dependencies outlined in Table 5 below needs to take place.

TABLE 5

| |
|---|
| Step 1: Recover App D and App C in parallel; |
| Step 2: Recover App A; |
| Step 3: Recover App B; and |
| Step 4: Recover App F. |

Each application team defines their own SOPs for fault domain recovery. The expectation is that some of the application teams will be available during failure events. However, the expectation is also that some application teams will not become available quickly enough to administer execution of their recovery procedures. For this reason, the SRE team is expected to administer SOPs for all of the five applications as necessary, which includes executing the override activities.

Figure 1B:
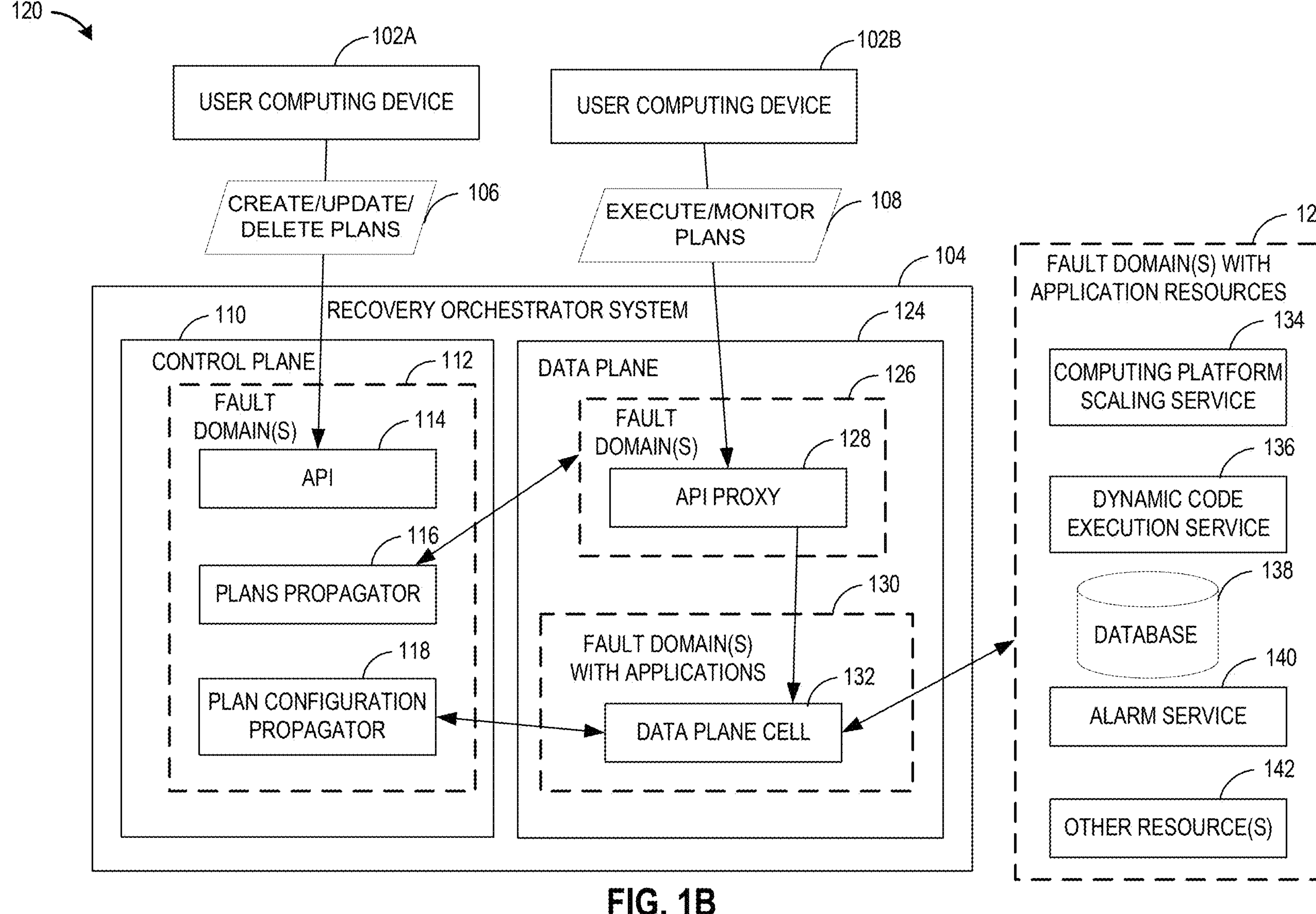
FIG. 1B is a schematic block diagram depicting an illustrative environment including a recovery orchestrator system that can implement application recovery plans.

FIG. 1B is a schematic block diagram depicting an illustrative environment 120 including a recovery orchestrator system 104 that can implement application recovery plans. The environment 120 can include a user computing device 102A, 102B, a recovery orchestrator system 104, and fault domain(s) with application resources 122. The recovery orchestrator system 104 can include a control plane 110 and a data plane 124. The control plane 110 can include an Application Programming Interface (API) 114, a plans propagator 116, and a plan configuration propagator 118.

The control plane 110 can be used to set up and manage plans. The control plane 110 can be hosted in one or more fault domains 112. In some embodiments, the control plane 110 can be hosted in a single fault domain 112. The API 114 of the control plane 110 can receive create/update/delete plans commands 106 from the user computing device 102A. User computing devices 102A, 102B can include, but are not limited to, a laptop or tablet computer, personal computer, personal digital assistant ("PDA"), hybrid PDA/mobile phone, smart wearable device (such as a smart watch), mobile phone, and/or a smartphone. The plans propagator 116 can communicate plans to the data plane 124. As described herein, the data plane 124 (such as an API proxy 128) can use the plans to proxy requests into the correct fault domain. The plan configuration propagator 118 can cause plan configurations to be propagated to the correct cells in the correct fault domains. The recovery orchestrator system 104 and the fault domains with application resources can use a cell-based architecture. A cell-based architecture can use multiple isolated instances of a workload, where each instance can be referred to as a cell. A cell can be a server.

The data plane 124 can be used to execute plans and monitor plan executions. The data plane can be hosted in multiple fault domains 126, 130. The data plane 124 can include an API proxy 128 and a data plane cell 132. To avoid a single fault domain dependency, an endpoint can route requests through multiple fault domains 126 (such as five regions). The API proxy 128 can receive execute/monitor plans commands 108 from the user computing device 102B. The API proxy 128 can cause recovery actions to be performed in the target fault domains 130, which can include the fault domains with the applications to be recovered. The data plane cell 132 can cause recovery actions to be performed in the fault domain(s) with application resources 122.

The fault domain(s) with application resources 122 can include a computing platform scaling service 134, a dynamic code execution service 136, a database 138, an alarm service 140, and other resources 142. The data plane cell 132 can cause, via the computing platform scaling service 134, a recovery action such as expanding or reducing computing platform instances in a computing platform. The data plane cell 132 can cause dynamic code execution via the dynamic code execution service 136. In some embodiments, the dynamic code execution service 136 can execute steps of a recovery plan. The data plane cell 132 can cause different types of database recovery actions to the database 138, such as graceful switchovers and ungraceful database failovers, depending on the type of recovery plan/step being executed. The data plane cell 132 can send a command to a database service to cause a corresponding database action. The data plane cell 132 can cause, via the alarm service 140, actions to occur, such as monitoring metrics, sending messages, evaluating expressions, and/or triggering actions on state changes.

The database 138 can be from a database system that allows a single database to span multiple fault domains, which can enable high performance of distributed applications. As used herein, a "database" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage.

The components of the environment 120, such as the recovery orchestrator system 104, the user computing devices 102A, 102B, and/or the fault domain(s) with application resources 122 can communicate over a network. The network may be any wired network, wireless network, or combination thereof. In addition, the network may be a personal area network, local area network, wide area network, cable network, satellite network, cellular telephone network, or combination thereof. In addition, the network may be an over-the-air broadcast network (e.g., for radio or television) or a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications ("GSM") network, a Code Division Multiple Access ("CDMA") network, a Long-Term Evolution ("LTE") network, or any other type of wireless network. The network can use protocols and components for communicating via the Internet or any of the other aforementioned types of networks, such as HTTP, TCP/IP, and/or UDP/IP.

The recovery orchestrator system 104 and/or the fault domain(s) with application resources 122 may be embodied in a plurality of devices. The recovery orchestrator system 104 and/or the fault domain(s) with application resources 122 may include a network interface, memory, hardware processor, and non-transitory computer-readable medium drive, all of which may communicate with each other by way of a communication bus. The network interface may provide connectivity over the network and/or other networks or computer systems. The hardware processor may communicate to and from memory containing program (a.k.a., computer-executable) instructions that the hardware processor executes in order to operate the recovery orchestrator system 104 and/or the fault domain(s) with application resources 122. Memory generally includes RAM, ROM, and/or other persistent and/or auxiliary non-transitory computer readable storage media.

Additionally, in some embodiments, the recovery orchestrator system 104 and/or the fault domain(s) with application resources 122 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer executable instructions. A hosted computing environment may also be referred to as a "serverless," "cloud," or "distributed" computing environment.

Figure 2:
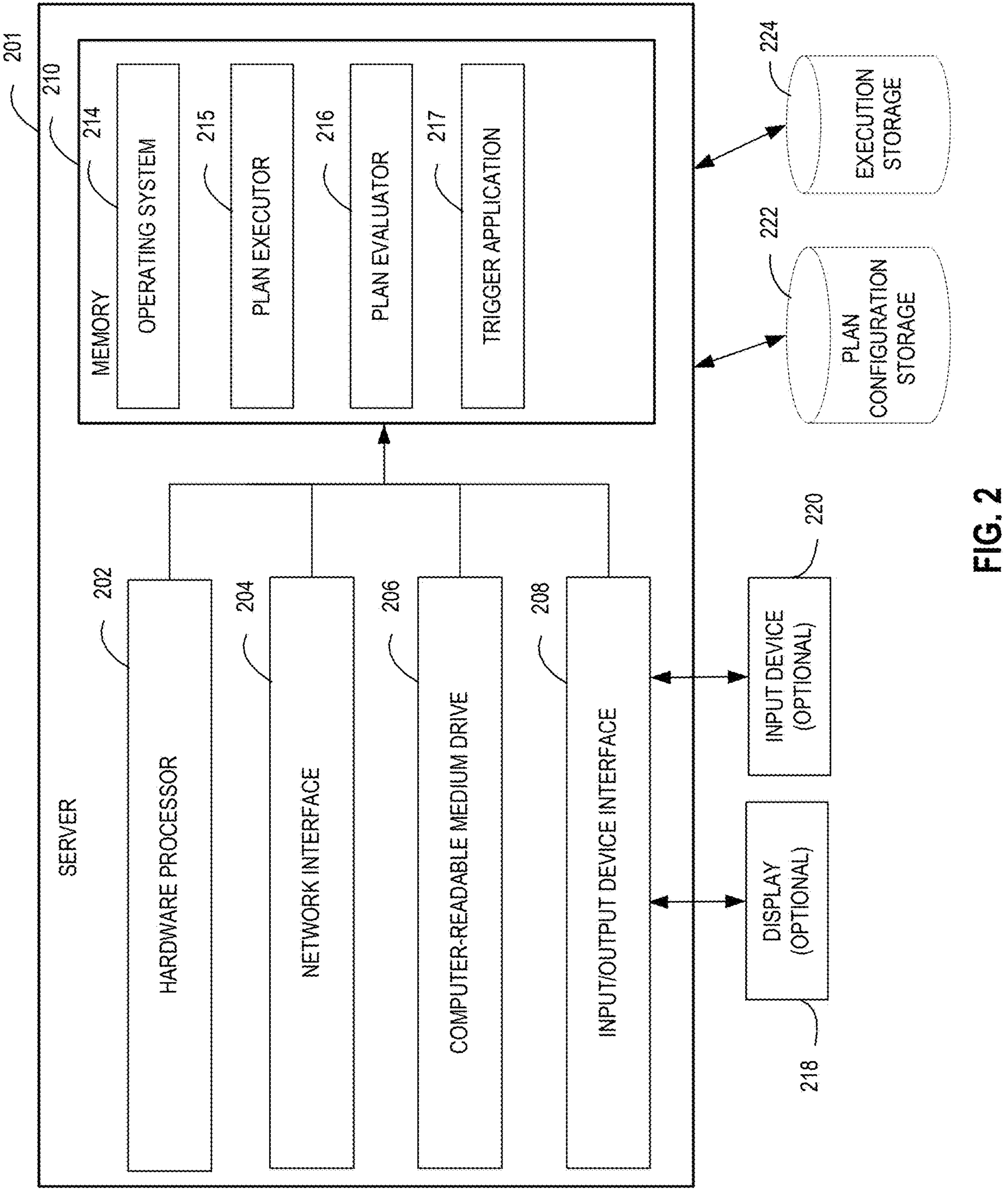
FIG. 2 is a schematic block diagram depicting an illustrative general architecture of a server for implementing aspects of the recovery orchestrator system referenced in the environment depicted in FIG. 1B.

FIG. 2 is a schematic diagram of an illustrative general architecture of a server 201 for implementing the recovery orchestrator system 104 referenced in the environment 120 in FIG. 1B. In particular, a server 201 can be used to implement a server in the data plane cell 132. The server 201 includes an arrangement of computer hardware and software components that may be used to execute the plan executor 215, the plan evaluator 216, and the trigger application 217. The general architecture of FIG. 2 can be used to implement other devices described herein, such as the user computing device 102A, 102B referenced in FIG. 1B. The server 201 may include more (or fewer) components than those shown in FIG. 2. Further, other computing systems described herein may include similar implementation arrangements of computer hardware and/or software components.

The server 201 for implementing a recovery orchestrator system 104 may include a hardware processor 202, a network interface 204, a non-transitory computer-readable medium drive 206, and an input/output device interface 208, all of which may communicate with one another by way of a communication bus. As illustrated, the server 201 is associated with, or in communication with, an optional display 218 and an optional input device 220. The network interface 204 may provide the server 201 with connectivity to one or more networks or computing systems. The hardware processor 202 may thus receive information and instructions from other computing systems or services via a network. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen.

The memory 210 may contain specifically configured computer program instructions that the hardware processor 202 executes in order to implement one or more embodiments of a device within the recovery orchestrator system 104. The non-transitory computer-readable medium drive 206 can store the computer program instructions. The memory 210 generally includes RAM, ROM and/or other persistent or non-transitory computer-readable storage media. The memory 210 may store an operating system 214 that provides computer program instructions for use by the hardware processor 202 in the general administration and operation of the device within the recovery orchestrator system 104.

The memory 210 may include the plan executor 215, the plan evaluator 216, and the trigger application 217 that may be executed by the hardware processor 202. In some embodiments, the plan executor 215, the plan evaluator 216, and/or the trigger application 217 may implement various aspects of the present disclosure. The plan executor 215 can execute steps of a recovery plan (which can be referred to as a workflow) in a target fault domain. This means that the execution of the recovery plan workflow will not be affected by the fault domain event (such as regional event) from which the original application is failing away from. Once the workflow starts, it can continue running from that one fault domain. In some embodiments, a plan execution can start by starting a new workflow in a workflow service. The workers can make progress on the plan execution by polling tasks from the workflow service. The plan configuration for the given plan execution can be persisted in the workflow service as the workflow execution input data. Decider code running on the workers can take the plan configuration, and events from the previous activity tasks, and make decisions on which activity task to execute next. Workers can be stateless—the entire active workflow execution state can reside in the workflow service.

The plan evaluator 216 can continuously evaluate and persist feasibility of plans, which can be referred to as plan validation. The plan evaluator 216 can check if resources exist and/or if there are sufficient permissions for a plan. The plan evaluator 216 can continuously collect and persist historical state of application resources, such as a computing instance count every n minutes. This data can be used by the plan evaluator 216. The plan evaluator 216 can run in every fault domain and work on the plans relevant to that fault domain.

The server 201 can communicate with the plan configuration storage 222 and the execution storage 224. The plan configuration storage 222 can include plan configurations, which can be propagated by the plan configuration propagator 118 of FIG. 1B. The execution storage 224 can include execution data, such as results from the plan evaluator 216 and/or logs from the plan executor 215. The plan evaluator 216 can retrieve execution data from the execution storage 224.

The trigger application 217 can allow users to configure triggers for their plans. The trigger application 217 can start a plan to deactivate a fault domain in a timely manner based on a user definition of the trigger. The trigger application 217 can run in every fault domain and work on the plans relevant to that fault domain. So, for a plan configured for multiple fault domains (such as Region_1 and Region_2) the trigger application 217 can continuously work in each of the fault domains. The trigger application 217 can retrieve execution data from the execution storage 224. The trigger application 217 can retrieve plan configurations from the plan configuration storage 222. Example pseudocode for a trigger is provided below in Table 6.

TABLE 6

| If alarm is continuously RED in Region_1 for 10 minutes AND alarm is continuously GREEN in Region_2 for at least 60 minutes, then start execution of plan to deactivate Region_1. |
|---|

In the case of a two-domain active/standby plan, the trigger application 217 can determine which fault domain is the standby fault domain, based on data from the plan configuration storage 222 and/or the execution storage 224. The trigger application 217 can evaluate the trigger in multiple fault domains of the plan, but it may initiate the execution of the plan only if it is running in the standby fault domain.

In the case of an active/active plan (and other plan types), any one of the plan fault domains may become impaired, and any one of the other plan fault domains may also become impaired. It may be undesirable for a plan execution to deactivate an impaired fault domain to start up in two fault domains at the same time. To prevent this plan fault domains can be logically broken into pairs; the execution to deactivate a fault domain may be allowed to start only in the fault domain with which it is paired.

Figure 3:
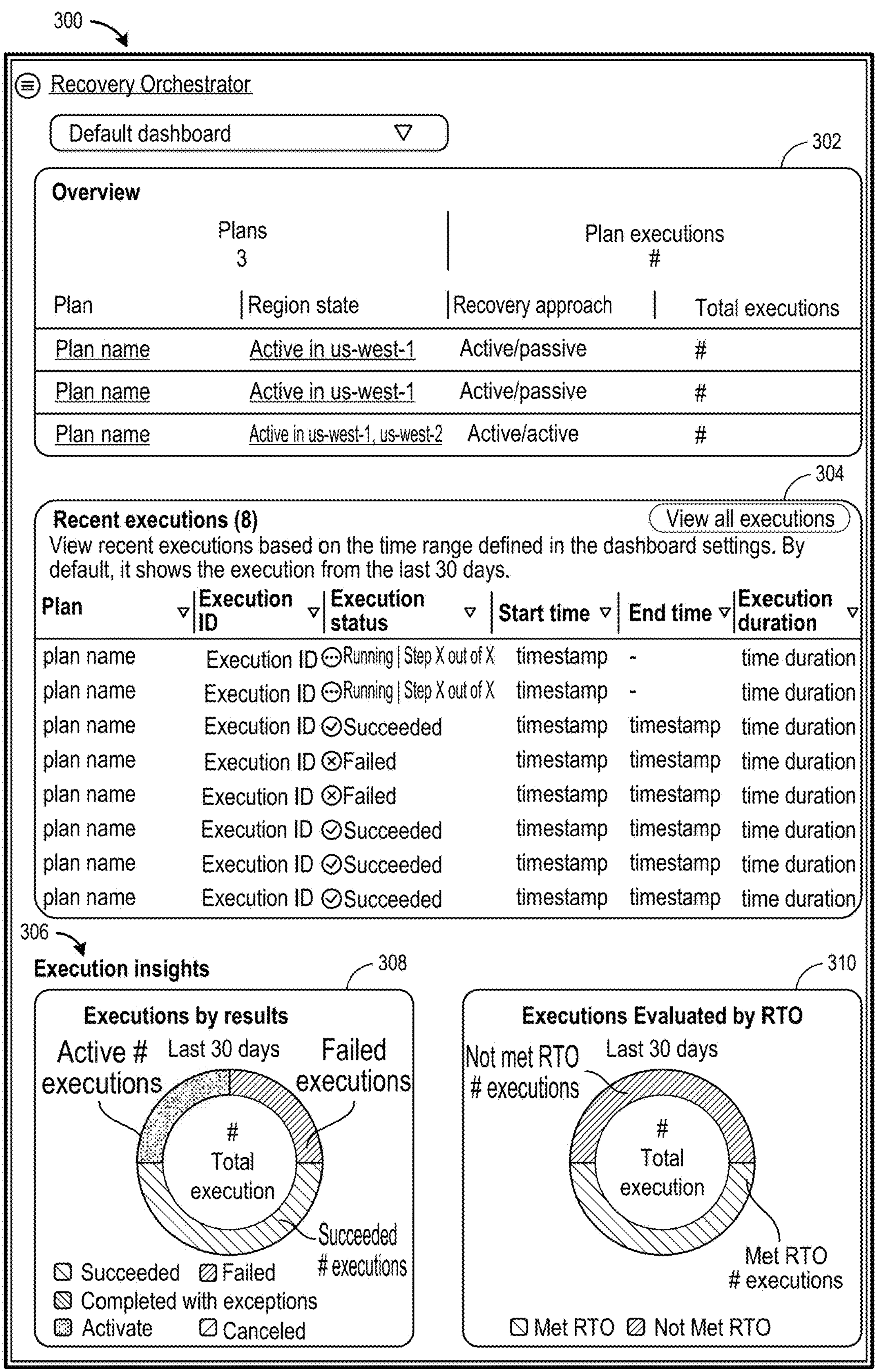
FIG. 3 depicts an example user interface presented on a user computing device referenced in the environment depicted in FIG. 1B.

FIG. 3 depicts a user interface 300 provided by the recovery orchestrator system 104, which can be presented via the user computing device 102A, 102B. The data shown in the user interface 300 can be placeholder values. For example, the "timestamp" text can be an actual timestamp value and the "plan name" text can be an actual name for a recovery plan. As shown, the user interface 300 can be a dashboard user interface. The user interface 300 can include an overview area 302, a recent executions area 304, and an execution insights area 306. The overview area 302 can present recovery plans (here three recovery plans). The recent executions area 304 can present recent executions of recovery plans, which can include metadata regarding each of the recent executions of recovery plans. The execution insights area 306 can include an executions by results area 308 and an executions evaluated by recovery time objectives area 310. The executions by results area 308 can present summary data regarding active executions, such as, but not limited to, active execution plans, failed execution plans, succeed executions, and a total number of executions. The executions evaluated by recovery time objectives area 310 can present summary data regarding executions that have met recovery time objectives, those that have not met recovery time objectives.

Figure 4:
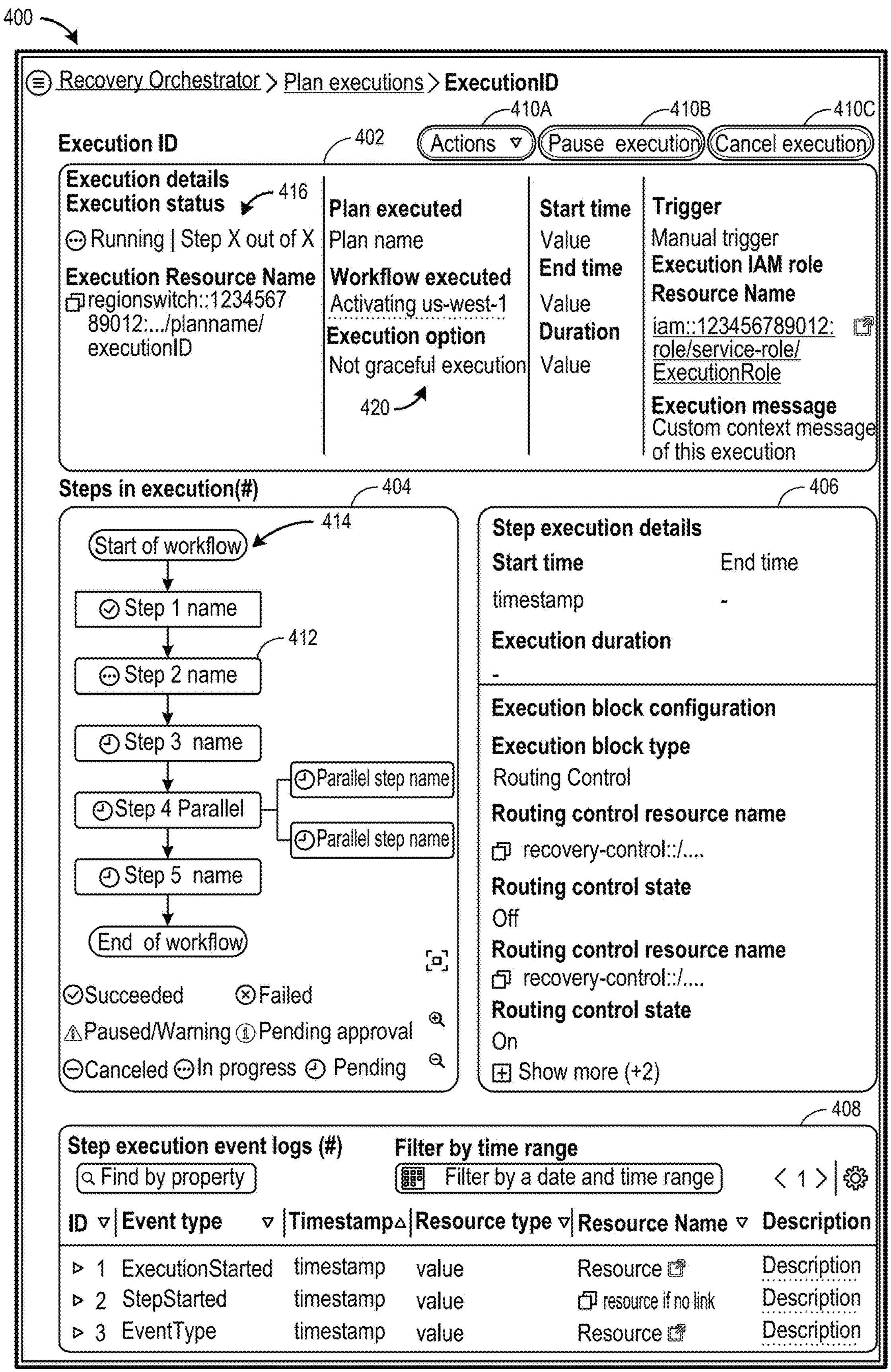
FIG. 4 depicts another example user interface presented on the user computing device referenced in the environment depicted in FIG. 1B.

FIG. 4 depicts a user interface 400 provided by the recovery orchestrator system 104, which can be presented via the user computing device 102A, 102B. The data shown in the user interface 400 can be placeholder values. For example, the "Step 1 name" text can be an actual name for a step in a recovery plan and "Step X out of X" text can have numerical values for the actual steps. As shown, the user interface 400 can be a plan execution user interface. The user interface 400 can include user interface controls 410A, 410B, 410C, a plan execution details area 402, a workflow plan area 404, a step execution details area 406, and a step execution event log area 408. A user can control an execution of a recovery plan with the user interface controls 410A, 410B, 410C, such as, but not limited to, starting, pausing, cancelling, or modifying a recovery plan execution.

The plan execution details area 402 can include details regarding the execution of a recovery plan. As shown, recovery plan execution details can include, but are not limited to, a current step in the recovery plan that is running, plan name, type of execution, start time, end time, type of trigger, and execution message. The plan execution details area 402 can present an indicator 416 showing the status of the execution of a recovery plan. The plan execution details area 402 can present an execution option 420 of the recovery plan. As shown, the execution option 420 can be a graceful execution option. As described herein, an alternative execution option can be an ungraceful execution option. The workflow plan area 404 can present a workflow of steps 414 in a recovery plan. As shown, the workflow plan area 404 can visualize the workflow of steps 414 as a flowchart. The step execution details area 406 can include details regarding the execution of a step 412. As shown, step execution details can include, but are not limited to, start time, end time, type of executing block. In some embodiments, a user can select a different step from the workflow of steps 414 to view that step's execution details in the step execution details area 406. The step execution event log area 408 can present log details regarding the step executions of the recovery plan.

Figure 5:
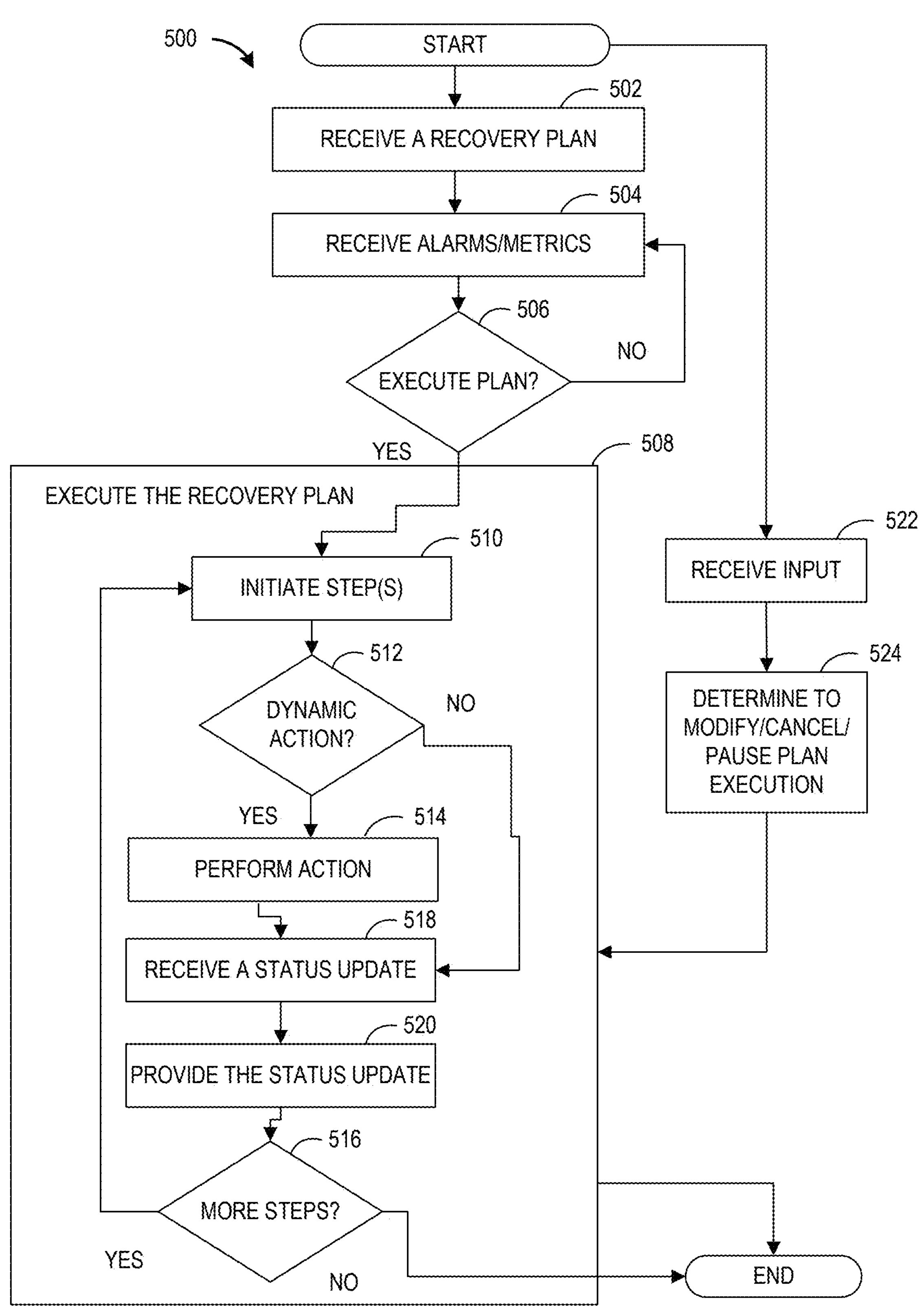
FIG. 5 is a flow chart depicting a method implemented by the recovery orchestrator system for automated multi-domain application recovery.

FIG. 5 includes a flow chart depicting a computer-implemented method 500 for automated multi-domain application recovery. As described herein, aspects of the recovery orchestrator system 104 may be implemented with the server 201 of FIG. 2. Also, as described herein, the recovery orchestrator system 104 can include a control plane 110 and a data plane 124. In some embodiments, the server 201 may include the plan executor 215, the plan evaluator 216, and the trigger application 217, which may implement aspects of the method 500. As described herein, the server 201 can implement aspects of the method 500.

Beginning at block 502, a recovery plan can be received. The API 114 of the control plane 110 can receive the recovery plan. In some embodiments, a user can create a recovery plan via a graphical user interface and the API 114 of the control plane 110 can receive the recovery plan from the graphical user interface. In some embodiments, a user can create a recovery plan via a command line interface and the API 114 of the control plane 110 can receive the recovery plan from the command line interface. The recovery plan can be for a server based software application associated with a fault domain. The recovery plan can include a recovery configuration and multiple steps. The recovery plan can be in an object notation format, such as, but not limited to, JavaScript Object Notation (JSON). In some embodiments, a user can provide a recovery time objective associated with the recovery plan. In some embodiments, the API 114 of the control plane 110 can receive the recovery time objective associated with the recovery plan. A user can design a recovery plan to address a use case, such as, but not limited to, a multi-domain active/passive use case, a multi-domain active/active use case, or a multi-application recovery use case, which are described herein.

In some embodiments, the recovery plan can include configuration for a step that indicates the type of execution/mode of execution. For example, the configuration can indicate graceful or ungraceful execution. A graceful indication can cause other systems to perform actions without causing disruptions, such as there not being any data loss (such as during a graceful database switchover). Conversely, ungraceful executions can cause other systems to perform actions for expediency where there may be disruptions such as the loss of data (such as during an ungraceful database failover). There is a third configuration option where a graceful action can be preferred, but if the action does not satisfy a threshold (such as a time completion threshold), then the recovery orchestrator system 104 can switch to an ungraceful operation. Moreover, the recovery plan can include configuration that indicates the entire execution for a recovery plan, where applicable, can be graceful (e.g., should not result in data loss) or ungraceful (e.g., may result in data loss). With such a configuration, during execution, individual steps can execute as graceful or ungraceful based on the execution type configuration for the entire recovery plan.

An example multi-domain active/passive recovery plan is provided below in Table 7. The steps of the recovery plan are provided in subsequent tables, Tables 7-13. The order of steps listed at line 12 of Table 7 and throughout Tables 8-13 (where parallel steps can be executed in parallel) can be the order of execution for the multiple steps.

TABLE 7

```
1   {
2     "planName": "multi-region-active-passive-plan",
3     "description": "A/P Plan.",
4     "executionRole":"iam::22222:role/planRole",
5     "recoveryApproach":"ACTIVE_PASSIVE",
6     "regions": [
7       "us-east-1",
8       "us-west-2"
9     ],
10    "workflows": [
11      {
12        "steps": [ . . . ] }]
13  }
```

In the example multi-domain active/passive recovery plan, the first steps of the recovery plan can run in parallel, as shown in Table 8 below. A configuration for parallel execution for multiple steps is shown at line 4 of Table 8. At lines 6-19 of Table 8, a first step is provided to cause automatic scaling of the passive fault domain (here "us-west-2"). As shown at line 17 of Table 8, a recovery configuration can specify, for autoscaling purposes, the computing capacity that a target fault domain (here a percentage of the active region) should have before switching over to the target fault domain. As shown at line 19 of Table 8, another recovery configuration can specify an alternate capacity that the target fault domain should have before switching over to the target fault domain in the case it is deemed to be unlikely for the autoscaling to succeed in a timely manner (this can be referred to as an ungraceful situation). At lines 20-28 of Table 8, a second parallel step is provided to request approval before proceeding with additional steps of the recovery plan.

TABLE 8

```
1   {
2     "name":"Preliminary steps",
3     "description":"The two steps inside this step will happen
in parallel",
4     "type":"parallel",
```

TABLE 8-continued

```
5     "parallel":[
6       {
7         "name":"Scale capacity up",
8         "description":"Increase capacity in the activating region",
9         "type":"computingCapacityIncrease",
10        "computingCapacityIncreaseConfiguration":{
11          "autoScaling":[{
12            "rn":"autoscaling:us-west-2:32481579"},
13            {
13            "rn":"autoscaling:us-east-1:32481579"}
14          }
15        ],
16        "timeout":"2h",
17        "blockUntilPercent":"90",
18        "ungraceful":{
19          "blockUntilPercent":"50" } } },
20      {
21        "name":"Approve by VP",
22        "type":"executionApproval",
23        "executionApprovalConfiguration":{
24          "approvalRole":" iam::32481579:role/
ExecuteApprovalRole",
25          "timeout":"1h",
26          "ungraceful":{
27            "behavior":"SKIP"
28          } } } ] },
```

In the example multi-domain active/passive recovery plan, the next step can be a dynamic code execution to cause a maintenance page to be put up in the currently active fault domain (here "us-east-1"), as shown in Table 9 below. As shown at line 8 of Table 9, the dynamic code execution step can include an identifier identifying code (here the identifier "dynamiccode:us-east-1:32481579:function:maintenancePage").

TABLE 9

```
1   {
2     "name":"Maintenance page",
3       "description":"Run dynamic code execution to put up a
maintenance page in the currently active region.",
4     "type":"customActionDynamicCodeExecution",
5     "customActionDynamicCodeExecutionConfiguration":{
6     "dynamicCode":[
7       {
8         "rn":"dynamiccode:us-east-1:32481579:function:
maintenancePage"
9       }
10    ],
11    "regionToRun":"DEACTIVATING_REGION",
12    "timeout":"1h",
13    "retryInterval":"5m",
14    "ungraceful":{
15      "behavior":"RETRY_IN_PARALLEL",
16      "retryInterval":"Optional"
17    } } },
```

In the example multi-domain active/passive recovery plan, the next step can be a dynamic code execution to cause fencing in the currently active fault domain (here "us-east-1"), as shown in Table 10 below. The dynamic code execution triggering fencing can cause the application in the fault domain to no longer receive additional requests. As shown at line 8 of Table 10, the dynamic code execution step can include an identifier identifying code (here the identifier "dynamiccode:us-east-1:32481579:function:TriggerFencingInUsEast1").

TABLE 10

```
1 {
2   "name":"Trigger fencing",
3     "description":"Run dynamic code execution to initiate fencing in the active region.
Best-effort because of the reliance on the potentially impaired region.",
```

TABLE 10-continued

```
"type":"customActionDynamicCodeExecution ",
" customActionDynamicCodeExecutionConfiguration":{
  "dynamicCode":[
    {
    "rn":"dynamiccode:us-east-1:32481579:function:TriggerFencingInUsEast1"
    }
  ],
  "regionToRun":"DEACTIVATING_REGION",
  "timeout":"1h",
  "retryInterval":"5m",
  "ungraceful":{
    "behavior":"RETRY_IN_PARALLEL",
    "retryInterval":"Optional" } } },
```

In the example multi-domain active/passive recovery plan, the next step can be a graceful database switchover step, as shown in Table 11 below. As shown at Table 11 line 10, the graceful database switchover step can include a recovery configuration of “PREFER_SWITCHOVER”. As described herein, based on the recovery configuration, the recovery orchestrator system 104 can execute a switchover with no data loss but, if the switchover is deemed to be unlikely to succeed in a timely manner, the system can automatically proceed with an ungraceful failover that may result in data loss.

TABLE 11

```
{
    "name":"Switchover Database",
    "description":"Switchover global distributed database into the activating region",
    "type":"database",
    "databaseConfiguration":{
      "databaseClusterRn":"rds::32481579:global-cluster",
      "behavior":"SWITCHOVER_ONLY",
      "timeout":"15m",
      "ungraceful":{
        "behavior":"PREFER_SWITCHOVER"
      } } },
```

In the example multi-domain active/passive recovery plan, subsequent database validation steps of the recovery plan can run in parallel, as shown in Table 12 below. At lines 6-12 of Table 12, a first database validation step is provided to request approval before proceeding with subsequent serial steps of the recovery plan. At lines 13-31 of Table 12, a second database validation step is a dynamic code execution that runs database validation scripts. As shown at lines 20 and 23 of Table 12, the dynamic code execution step can include identifiers identifying code (here the identifiers “dynamiccode:us-east-1:32481579:function:DatabaseValidationScript” and “dynamiccode:us-west-2:32481579:function:DatabaseValidationScript”).

TABLE 12

```
{
  "name":"Database validation steps",
  "description":"The two steps inside this step will happen in parallel",
  "type":"parallel",
  "parallel":[
    {
    "name":"Approval by the Database team",
    "type":"executionApproval",
    "executionApprovalConfiguration":{
      "approvalRole":"iam::32481579:role/DatabaseTeamApprovalRole",
      "timeout":"1h" }
    },
    {
    "name":"Automatic database validation",
     "description":"Run dynamic code execution that runs database validation scripts. Continue running the dynamic code execution until it succeeds.",
    "type":"customActionDynamicCodeExecution",
    "customActionDynamicCodeExecutionConfiguration":{
      "dynamicCode":[
        {
          "rn":"dynamiccode:us-east-1:32481579:function:DatabaseValidationScript"
        },
        {
          "rn":"dynamiccode:us-west-2:32481579:function:DatabaseValidationScript"
        } ],
      "regionToRun":"IN_ACTIVE_REGION",
      "timeout":"1h",
      "retryInterval":"1m",
      "ungraceful":{
        "behavior":"UNCHANGED",
        "retryInterval":"Optional"
      } } } ] },
```

In the example multi-domain active/passive recovery plan, the next step can be to update DNS records for traffic shifting purposes, as shown in Table 13 below. In this particular case, the DNS records can be swapped to route traffic away from the now passive fault domain (here "us-east-1") and into the activated fault domain (here "us-west-2").

TABLE 13

```
{
    "name":"Update DNS",
  "description":"Flip DNS records so that the traffic shifts into the newly activated region",
     "type":"routingControl",
     "routingControlConfiguration":{
        "timeout":"optional",
        "stateChanges":[
           {
            "region":"us-west-2",
              "routingControl":"dns-recovery-control::32481579:routingcontrol/8125fd",
              "routingControlStateChangeOnActivate":"ON",
              "routingControlStateChangeOnDeactivate":"OFF"
           },
           {
              "region":"us-east-1",
              "routingControl":"dns-recovery-control::32481579:routingcontrol/3245c5",
              "routingControlStateChangeOnActivate":"ON",
              "routingControlStateChangeOnDeactivate":"OFF"
           } ] } }
```

An example multi-domain active/active data layer recovery plan is provided below in Table 14. The steps of the data layer recovery plan are provided in subsequent tables, Tables 15 and 16. The order of steps listed at line 12 of Table 14 and throughout Tables 15 and 16 (where parallel steps can be executed in parallel) can be the order of execution for the multiple steps.

TABLE 14

```
{
    "planName": "multi-region-active-active-data-layer-plan",
    "description": "A multi-region active/active data layer plan.",
    "executionRole": "iam::33333:role/planRole",
    "recovery Approach": "ACTIVE_ACTIVE",
    "regions": [
       "us-east-1"
       "us-west-2"
    ],
     "workflows": [
       {
         "steps": [ . . . ] } ]
}
```

In the example multi-domain active/active data layer recovery plan, a first step can be a request for approval before proceeding with additional steps of the recovery plan, as shown in Table 15 below. In particular, an operator can review a graphical user interface dashboard and the operator either approves the graceful switchover or switches the execution to ungraceful to perform a failover during recovery.

TABLE 15

```
{
    "name":"Operator review",
    "description":"The operator reviews the dashboards and either
approves the switchover or switches the execution to ungraceful to
perform a failover",
    "type":"executionApproval",
    "executionApprovalConfiguration":{
    "approvalRole":" iam::05641283:role/ExecuteApprovalRole",
       "timeout":"1h",
       "ungraceful":{
       "behavior":"SKIP"
       } } }
```

In the example multi-domain active/active data layer recovery plan, the subsequent steps of the recovery plan can run in parallel, as shown in Table 16 below. At lines 5-16 of Table 16, a step is provided for a graceful database switchover. At lines 17-30 of Table 16, a parallel step is provided to update a routing control state to update DNS to point the database endpoint into the cluster in the activating fault domain.

TABLE 16

```
{
  "name":"Parallel",
  "type":"parallel",
  "parallel":[
    {
      "name":"Switchover Database",
      "description":"Switchover global distributed database into the activating region",
      "type":"database",
      "databaseConfiguration":{
         "databaseClusterRn":"rds::05641283:global-cluster",
         "behavior":"SWITCHOVER_ONLY",
         "timeout":"1h",
         "ungraceful":{
```

TABLE 16-continued

```
"behavior":"FAILOVER"
        } }
    },
    {
        "name":"Update DNS for database endpoint",
        "description": "Updates the routing control state to update DNS to point the database endpoint into the cluster in the activating region. A single routing control controls the endpoint.",
        "type":"routingControl",
        "routingControlConfiguration":{
            "timeout":"Optional",
            "stateChanges":[
                {
                    "region":"us-west-2",
                    "routingControl":"dns-recovery-control::05641283:routingcontrol/1111",
                    "routingControlStateChangeOnActivate":"ON",
                    "routingControlStateChangeOnDeactivate":"OFF"
                } ] } } ] }
```

An example multi-domain active/active computing layer recovery plan is provided below in Table 17. The steps of the computing layer recovery plan are provided in subsequent tables, Tables 18 and 19. The order of steps listed at line 12 of Table 17 and throughout Tables 18 and 19 (where parallel steps can be executed in parallel) can be the order of execution for the multiple steps.

TABLE 17

```
{
    "planName": "multi-region-active-active-computing-layer-plan",
    "description": "A multi-region active/active computing layer plan.",
    "executionRole": "iam::4444:role/planRole ",
    "recoveryApproach": "ACTIVE_ACTIVE",
    "regions": [
        "us-east-1",
        "us-west-2"
    ],
    "workflows": [
        {
        "steps": [ . . . ] } ]
}
```

In the example multi-domain active/active computing layer recovery plan, a first step is provided to cause automatic scaling of the healthy fault domain, as shown in Table 18.

TABLE 18

```
{
    "name":"Add capacity",
    "description":"Will make computing platform scaling service add capacity, if needed. Will block until the capacity is increased by at least 70% of the identified gap.",
    "type":"computingCapacityIncrease",
    "computingCapacity IncreaseConfiguration":{
        "autoScaling":[
            {
                "rn":"autoscaling:us-east-2:45840131"
            },
            {
                "rn":"autoscaling:us-east-1:45840131"
            }
        ],
        "timeout":"2h",
        "blockUntilPercent":"70",
        "ungraceful":{
        "blockUntilPercent":"50"
        }
    }
}
```

In the example multi-domain active/active computing layer recovery plan, a second step is provided to use DNS for traffic shifting purposes, as shown in Table 19 below. In this particular case, DNS routing controls can be used to route traffic away from the unhealthy fault domain and into the healthy fault domain instead.

TABLE 19

```
{
    "name":"Update DNS",
    "description":"Will update routing control states to shift traffic away or back into the region.",
    "type":"routingControl",
    "routingControlConfiguration":{
        "stateChanges":[
            {
                "region":"us-east-2",
                "routingControl":"dns-recovery-control::45840131:routingcontrol/a13dj2",
                "routingControlStateChangeOnActivate":"ON",
                "routingControlStateChangeOnDeactivate":"OFF"
            },
            {
                "region":"us-east-1",
                "routingControl":"dns-recovery-control::45840131:routingcontrol/f9c78d",
                "routingControlStateChangeOnActivate":"ON",
                "routingControlStateChangeOnDeactivate":"OFF"
            } ] } }
```

An example multi-application recovery plan is provided below in Table 20. The steps of the recovery plan are provided in subsequent tables, Tables 21 and 22. The steps of the recovery plan can outline how the recovery process should be orchestrated across multiple applications (here five applications), which is described in further detail herein, such as with respect to Table 5. The order of steps listed at line 12 of Table 20 and throughout Tables 21 and 22 (where parallel steps can be executed in parallel) can be the order of execution for the multiple steps.

TABLE 20

```
{
    "planName": "multi-application-plan",
    "description": "A multi-application recovery plan.",
    "executionRole": "iam::11111111:role/planRole",
    "recoveryApproach": "ACTIVE_PASSIVE",
    "regions": [
        "us-east-1",
        "us-west-2"
    ],
```

TABLE 20-continued

```
        "workflows": [
          {
            "steps": [ . . . ] } ]
        }
```

In the example multi-application recovery plan, the first steps of the recovery plan can run in parallel, as shown in Table 21 below. At lines 6-13 of Table 21, a first parallel step is provided to recover application D. As shown and described herein, the multi-application recovery plan can cause the recovery orchestrator system 104 to execute additional recovery plans. At lines 14-21 of Table 21, a second parallel step is provided to recover application D.

TABLE 21

```
{
  "name":"D and C",
  "description":"The two steps inside this step (D and C)
will happen in parallel",
  "type":"parallel",
  "parallel":[
    {
      "name":"Run D",
      "type":"recoveryPlan",
      ’recoveryPlanConfiguration":{
      "rn":"recovery::11111111:plan:app-D",
      "crossAccountRole":"iam::11111111:role/
AssumableByThePlanRole",
      "timeout":"1h" }
    },
    {
      "name":"Run C",
      "type":"recoveryPlan",
      "recoveryPlanConfiguration":{
      "rn":"recovery::22222222:plan:app-C",
      "crossAccountRole":"iam::22222222:role/
AssumableByThePlanRole",
      "timeout":"1h" }
    } ]
}
```

In the example multi-application recovery plan, subsequent steps of the recovery plan are provided for sequential execution, which can indicate dependencies of the subsequent applications, as shown in Table 22 below. For example, the recovery plan execution of application A (lines 1-8 of Table 22) is dependent on the parallel execution of applications D and C (Table 21); the recovery plan execution of application B (lines 9-16 of Table 22) is dependent on the recovery plan execution of application A (lines 1-8 of Table 22); and the recovery plan execution of application F (lines 17-24 of Table 22) is dependent on the recovery plan execution of application B (lines 9-16 of Table 22).

TABLE 22

```
{
  "name":"Run A",
  "type":"recoveryPlan",
  "recoveryPlanConfiguration":{
    "arn":"recovery::333333333:plan:app-A",
    "crossAccountRole":"iam::333333333:role/
AssumableByThePlanRole",
    "timeout":"1h" }
},
{
  "name":"Run B",
  "type":"recoveryPlan",
  "recoveryPlanConfiguration":{
  "rn":"recovery::4444444444:plan:app-B",
  "crossAccountRole":"iam::4444444444:role/
```

TABLE 22-continued

```
AssumableByThePlanRole",
    "timeout":"1h" }
  },
  {
    "name":"Run F",
    "type":"recoveryPlan",
    "recoveryPlanConfiguration":{
    "rn":"recovery::55555555555:plan:app-F",
    "crossAccountRole":"iam::55555555555:role/
AssumableByThePlanRole",
    "timeout":"1h" }
  }
```

At block 504, an alarm indication and/or metric can be received. The trigger application 217 can receive an alarm indication and/or metric from the alarm service 140. In particular, the trigger application 217 can receive an alarm indication for a monitoring metric. The alarm indication and/or metric can be associated with one or more applications and/or recovery plans. The monitoring metric can be associated with a fault domain and can indicate a health of the fault domain. An alarm and/or monitoring metric can be specified by a user. The alarm indication and/or metric can indicate the status of an application or a service, hardware, or network associated with the application. Metrics can include, but are not limited to, instance metrics, CPU metrics, host metrics, database metrics (such as replication lag), network telemetry metrics, etc. In some embodiments, the trigger application 217 can determine an elapsed time associated with receipt of the alarm indication. The trigger application 217 can determine an indication based at least in part on the recovery time objective and the elapsed time. For example, determining the indication can include determining a predicted execution time for the recovery plan; and determining a difference between (i) the elapsed time and the predicted execution time and (ii) the recovery time objective, where the indication can be indicative of the difference. The recovery orchestrator system 104 can provide the indication. For example, the recovery orchestrator system 104 can cause presentation, via a graphical user interface, of the indication. For example, a recovery time objective can be twenty minutes, and the recovery orchestrator system 104 can determine that five minutes have elapsed since an alarm and historically a recovery plan has taken ten minutes to complete, then the recovery orchestrator system 104 can present to a user that there is five minutes to make a decision to execute the recovery time to satisfy the recovery time objective.

At block 506, it can be determined whether to execute a recovery plan. In some embodiments, the determination of whether to execute a recovery plan can be automated, partially automated, or manual. The trigger application 217 can determine whether to execute a recovery plan. As described herein with respect to Table 6, example trigger logic can include the following: “If alarm is continuously RED in Region_1 for 10 minutes AND alarm is continuously GREEN in Region_2 for at least 60 minutes, then start execution of plan to deactivate Region_1.” In some embodiments, a user can initiate a recovery plan, such as via a graphical user interface. Additionally or alternatively, the recovery orchestrator system 104 can provide an alarm to a user, and based on the configuration, the recovery orchestrator system 104 can require user approval before proceeding with execution of a recovery plan. If it is determined to execute the recovery plan, the method 500 can proceed to block 508 to execute the recovery plan. Conversely, if it is determined to not execute the recovery plan at this time, then the method 500 can return to block 504 to receive additional alarm indications and/or metrics.

At block 508, a recovery plan can be executed. The plan executor 215 can execute the recovery plan. Part of executing the recovery plan can include executing steps of the recovery plan. The recovery plan can include an order of execution for the multiple steps. As described herein, the plan executor 215 can process the workflow within the recovery plan to determine which steps to execute and the order in which to execute the steps (see Tables 7-22). The plan executor 215 can then execute the steps according to the order.

In some embodiments, the plan executor 215, which can be in conjunction with the plan evaluator 216, can determine the fault domain(s) where recovery plan steps/recovery actions should occur. The plan executor 215 can determine a health status of the particular fault domain (such as the source fault domain, a target fault domain, or some other fault domain). The plan executor 215 can select, based at least in part on the health status, the particular fault domain from multiple domains for a recovery action/step to occur. For example, if the source fault domain or the target fault domain, is experiencing a fault event, the plan executor 215 can select a different fault domain for the recovery action/step to occur.

At block 510, a step can be initiated. The plan executor 215 can initiate a step from the recovery plan. The plan executor 215 can cause a first recovery action to occur with respect to a first server associated with a first fault domain or a second fault domain. The plan executor 215 can cause the first recovery action to occur based at least in part on a step from the multiple steps of the recovery plan and the recovery configuration. For example, a step can be a graceful database switchover step, the recovery action can be a graceful database switchover action, and the recovery configuration can be a "PREFER_SWITCHOVER" configuration. As described herein, based on the recovery configuration, the recovery orchestrator system 104 can initiate a graceful switchover with no data loss but, if the graceful switchover is deemed to be unlikely to succeed in a timely manner, the system can automatically proceed with an ungraceful failover that may result in data loss. In the case of a graceful database switchover, the first server can be a database server in the target fault domain. In causing a recovery action to occur, the plan executor 215 can send a command to a database service to initiate a graceful database switchover to a different fault domain.

Additional step types can include but are not limited to request approval steps, dynamic code execution steps, parallel steps, scaling capacity steps, database validation steps, networking steps, etc. For example, as described herein, the first recovery action can be an autoscaling action where the plan executor 215 updates the computing capacity of the target fault domain. As described herein, a recovery configuration can specify, for autoscaling purposes, the threshold computing capacity that a target fault domain (such as a percentage of the active region) should have before switching over to the target fault domain. In the case of autoscaling, the first server can be a computing device associated with a hosted computing platform in the target fault domain. The plan executor 215 can send, based at least in part on the recovery configuration, a command to a computing platform scaling service 134 to add processing capacity (such as new instances) in a computing platform. In the case of parallel execution for two or more steps, the plan executor 215 can initiate parallel execution of the two or more steps.

At block 512, the plan executor 215 can determine whether a dynamic action should be performed. The plan executor 215 can receive an output associated with the first recovery action. For example, if the first recovery action was for a graceful database switchover, then the plan executor 215 can receive output as an indicator whether the graceful database switchover has completed or is in progress. The plan executor 215 can determine, based at least in part on the recovery configuration, that the output fails to satisfy a threshold. The plan executor 215 can have a threshold value for a time limit for the graceful database switchover to complete and if the time fails to satisfy the threshold, then the plan executor 215 can determine that a dynamic action should be performed.

As another example, if the first recovery action is an autoscaling action, then the plan executor 215 can monitor the capacity following autoscaling. The plan executor 215 can receive one or more outputs related to autoscaling, such as the current capacity level of the target fault domain and/or a time elapsed since starting the autoscaling action. If the capacity satisfies a threshold, then the plan executor 215 can end the step and allow the switchover to the target fault domain to eventually occur. Conversely, the plan executor 215 can determine that it is unlikely for the autoscaling to succeed in a timely manner (such as the autoscaling to fail to satisfy a time completion threshold) and the plan executor 215 can determine that a dynamic action should be performed.

If it is determined to perform a dynamic action, the method 500 can proceed to block 514 to perform a dynamic action. Conversely, if it is determined that a dynamic action is not necessary, then the method 500 can proceed to block 518 to check to receive status updates regarding execution of the step(s).

At block 514, a dynamic action can be performed. The plan executor 215 can cause a second recovery action to occur on the first server. For example, if the first recovery action is a graceful database switchover action that has not succeeded in the allotted time and the recovery configuration is a "PREFER_SWITCHOVER" configuration, then the plan executor 215 can cause an ungraceful database failover action, which may result in data loss. In the case of a database failover, the first server can be a database server in the target fault domain. As another example, if the first recovery action is an autoscaling action, the autoscaling action has not succeeded in the allotted time, and there is an alternate recovery configuration (such as an alternate percentage of the active region), then the plan executor 215 can update an autoscaling parameter to a different value. The plan executor 215 can determine a second recovery configuration that corresponds to a second threshold capacity different from the first threshold capacity (which can be specified in the recovery plan). The plan executor 215 can send a command to a computing platform scaling service 134 to change capacity to a different value. In some embodiments, the plan executor 215 can send, based at least in part on the second recovery configuration, a second command to the computing platform scaling service to satisfy the second threshold capacity.

At block 518, a status update can be received. The plan evaluator 216 can receive a status update regarding execution of the recovery plan and a second fault domain, such as a target fault domain. The plan evaluator 216 can receive status updates regarding completion of one or more steps from the recovery plan.

At block 520, a status update can be provided. The plan evaluator 216 can provide the status update to a computing device. In some embodiments, the recovery orchestrator system 104 can cause presentation of the status of a recovery plan execution in a graphical user interface. The recovery orchestrator system 104 can cause presentation, via the graphical user interface, of an indicator of the status update. Graphical user interfaces of the recovery orchestrator system 104 are described herein, such as the graphical user interface 400 of FIG. 4.

At block 516, it can be determined whether there are more steps for initiating. The plan executor 215 can determine whether there are more steps in the recovery plan to be initiated. As described herein, the plan executor 215 can process the workflow within the recovery plan to determine which steps to execute and the order in which to execute the steps (see Tables 7-22). If it is determined that there are additional steps, the method 500 can return to block 510 to initiate additional step(s) from the recovery plan. Conversely, if it is determined that there are no additional steps, then the method 500 can end.

At block 510, as described herein, additional steps can include but are not limited to request approval steps, dynamic code execution steps, parallel steps, scaling capacity steps, database validation steps, and/or networking steps. For example, the plan executor 215 can invoke a database validation script for execution on a database server within a fault domain (such as the target region following a database switchover or failover). As another example, according to a next step in the recovery plan, the plan executor 215 can cause some or all requests to be forwarded to another fault domain, such as an in active/passive or active/active recovery model. The next step can be a domain name service change. The plan executor 215 can send a command to a domain name service, where the command causes the domain name service to redirect all requests from the first fault domain to the second fault domain (such as following completion of change-over steps in an active/passive recovery model). As described herein, DNS records could be flipped between the active and passive endpoints. The plan executor 215 can send a command to a domain name service, where the command causes the domain name service to redirect some requests from the first fault domain to the second fault domain (such as following completion of change-over steps in an active/active recovery model). As described herein, with a DNS service change, traffic can be shifted away from the unhealthy fault domain to the healthy fault domain for a period of time.

As another example, a step in the recovery plan can be a step for dynamic code execution. As described herein, such as with respect to Tables 9, 10, and 12, a dynamic code execution step can include an identifier identifying code. The plan executor 215 can send a command to a dynamic code execution service that causes execution of the code. As described herein, a step in the recovery plan can refer to another recovery plan, as described herein, such as with respect to Tables 20-22. For example, one or more steps in the recovery plan can correspond to distinct recovery plan for other software applications (such as in the case of a software application that has dependencies on other software applications during recovery). The recovery plan can include a dependency where one step in the recovery plan can depend on another step in the recovery plan. The plan executor 215 can initiate execution of a second recovery plan for a second software application. The plan executor 215 can receive confirmation that the second recovery plan executed. The plan executor 215 can initiate, based at least in part on a dependency of a third step on the second step, execution of a third recovery plan for a third software application. As another example, a step in the recovery plan can be a step for user approval. The plan executor 215 can request, via user interface (such as a graphical user interface), user approval before processing a subsequent step from the steps in the recovery plan.

At block 522, input can be received. As shown, input can be received at any time during plan execution. The plan evaluator 216 and/or the trigger application 217 can receive input. The trigger application 217 can receive an alarm indication and/or metric from the alarm service 140. During execution of a recovery plan, the trigger application 217 can receive an alarm indication for a monitoring metric associated with a fault domain (such as the target region of a recovery plan). For example, an urgent alarm indication (such as a "Red" alarm) can be received for a monitoring metric (such as network latency and/or status of computing hardware) associated with a region. The recovery orchestrator system 104 can cause presentation, via a graphical user interface, of a visual indication of the alarm indication. In some embodiments, the recovery orchestrator system 104 can receive user input indicative of a modification to the recovery plan.

At block 524, it can be determined to modify/cancel/pause a recovery plan execution. The recovery orchestrator system 104 can receive, via the graphical user interface, user input to pause or cancel execution of the recovery plan. In some embodiments, the recovery orchestrator system 104 can automatically pause or cancel execution of the recovery plan. For example, based on configuration, the recovery orchestrator system 104 can determine to pause or cancel execution of the recovery plan in response to receiving a particular type of alarm indication. The plan executor 215 can cause execution of the recovery plan to pause or cancel, which can cause any unexecuted steps in the recovery plan to not execute. In the case of a modification to a recovery plan during recovery plan execution, the recovery orchestrator system 104 can modify the recovery plan that results in a modified recovery plan. For example, the modification to the recovery plan can include but is not limited to changing the execution option (such as graceful execution or ungraceful execution) of the entire recovery plan or an execution option (such as graceful execution or ungraceful execution) for individual steps of the recovery plan. The plan executor 215 can execute the modified recovery plan, which can include executing modified steps of the recovery plan.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computer hardware processors. The code modules (including computer-executable instructions) may be stored in any type of non-transitory computer-readable storage medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor ("DSP"), an ASIC, an FPGA or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, and/or elements. Thus, such conditional language is not generally intended to imply that features, and/or elements are in any way required for one or more embodiments or that one or more embodiments necessarily include logic for deciding, with or without user input or prompting, whether these features, and/or elements are included or are to be performed in any particular embodiment. The terms "comprising," "including," "having," and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
- receiving a recovery plan for a server based software application associated with a first region, the recovery plan comprising (i) a first recovery configuration and (ii) a plurality of steps;
- receiving a first alarm indication associated with the recovery plan, wherein the first alarm indication is for a first monitoring metric associated with the first region;
- executing the recovery plan, wherein executing the recovery plan further comprises:
  - causing, based on a first step from the plurality of steps and the first recovery configuration, a first recovery action to occur with respect to a first server associated with at least one of the first region or a second region;
  - receiving an output associated with the first recovery action;
  - determining, based on the first recovery configuration, that the output fails to satisfy a threshold; and
  - causing a second recovery action to occur with respect to the first server;
- receiving a status update regarding execution of the recovery plan and the second region; and
- causing presentation, via a graphical user interface, of an indicator of the status update.

2. The computer-implemented method of claim 1, further comprising:
- receiving a recovery time objective associated with the recovery plan;

determining an elapsed time associated with receipt of the first alarm indication;

determining an indication based on the recovery time objective and the elapsed time; and causing presentation, via the graphical user interface, of the indication.

3. The computer-implemented method of claim 2, wherein determining the indication based on the recovery time objective and the elapsed time further comprises:

determining a predicted execution time for the recovery plan; and determining a difference between (i) the elapsed time and the predicted execution time and (ii) the recovery time objective, wherein the indication is indicative of the difference.

4. The computer-implemented method of claim 1, further comprising:

receiving a second alarm indication for a second monitoring metric associated with the second region;

causing presentation, via the graphical user interface, of a visual indication of the second alarm indication;

receiving, via the graphical user interface, user input to pause or cancel the recovery plan; and causing execution of the recovery plan to pause or cancel.

5. The computer-implemented method of claim 1, further comprising:

receiving user input indicative of a modification to the recovery plan;

modifying the recovery plan to create a modified recovery plan; and executing the modified recovery plan.

6. A system comprising:

A non-transitory data storage medium to store specific computer-executable instructions; and a computer hardware processor in communication with the non-transitory data storage medium, wherein the specific computer-executable instructions configure the computer hardware processor to at least:

receive a recovery plan for a server based software application associated with a first fault domain, the recovery plan comprising a recovery configuration and a plurality of steps; receive an alarm indication associated with the recovery plan, wherein the alarm indication is for a monitoring metric; execute the recovery plan, wherein to execute the recovery plan, the specific computer-executable instructions configure the computer hardware processor to at least: cause, based on a first step from the plurality of steps and the recovery configuration, a first recovery action to occur with respect to a first server associated with at least one of the first fault domain or a second fault domain; receive an output associated with the first recovery action; determine, based on the recovery configuration, that the output fails to satisfy a threshold; and cause a second recovery action to occur with respect to the first server; receive a status update regarding execution of the recovery plan and the second fault domain; and cause presentation, via a graphical user interface, of an indicator of the status update.

7. The system of claim 6, wherein the plurality of steps comprises a second step for dynamic code execution, wherein the second step comprises an identifier identifying first code, wherein to execute the recovery plan, additional computer-executable instructions configure the computer hardware processor to at least:

send a command to a dynamic code execution service that causes execution of the first code.

8. The system of claim 6, wherein the recovery plan further comprises an order of execution for the plurality of steps, and wherein to execute the recovery plan, additional computer-executable instructions configure the computer hardware processor to at least:

execute the plurality of steps according to the order.

9. The system of claim 8, wherein the plurality of steps comprises (i) a second step corresponding to a second recovery plan for a second software application and (ii) a third step corresponding to a third recovery plan for a third software application, wherein the recovery plan further comprises a dependency of the third step on the second step, and wherein to execute the recovery plan, additional computer-executable instructions configure the computer hardware processor to at least:

initiate execution of the second recovery plan for the second software application;

receive confirmation that the second recovery plan executed; and initiate, based on the dependency of the third step on the second step, execution of the third recovery plan for the third software application.

10. The system of claim 6, wherein the recovery plan further comprises a configuration for parallel execution for two or more steps of the plurality of steps, and wherein to execute the recovery plan, additional computer-executable instructions configure the computer hardware processor to at least:

initiate parallel execution of the two or more steps.

11. The system of claim 6, wherein the plurality of steps comprises a second step for user approval, wherein to execute the recovery plan, additional computer-executable instructions configure the computer hardware processor to at least:

request, via user interface, user approval before processing a subsequent step from the plurality of steps.

12. The system of claim 6, wherein to cause the first recovery action to occur, further computer-executable instructions configure the computer hardware processor to at least:

send a first command to a database service to initiate a graceful database switchover from the first fault domain to the second fault domain.

13. A system comprising: a non-transitory data storage medium to store specific computer-executable instructions; and a computer hardware processor in communication with the non-transitory data storage medium, wherein the specific computer-executable instructions configure the computer hardware processor to at least:

receive a recovery plan for a server-based software application associated with a first fault domain, the recovery plan comprising a first recovery configuration and a plurality of steps; execute the recovery plan, wherein to execute the recovery plan, the specific computer-executable instructions configure the computer hardware processor to at least:

cause, based on a first step from the plurality of steps and the first recovery configuration, a first recovery action to occur with respect to a first server associated with a particular fault domain;

receive an output associated with the first recovery action; determine, based on the first recovery configuration, that the output fails to satisfy a threshold; and cause a second recovery action to occur with respect to the first server; receive a status update regarding execution of the recovery plan and a second fault domain; and provide the status update to a computing device.

14. The system of claim 13, wherein to cause the first recovery action to occur, further computer-executable instructions configure the computer hardware processor to at least:

send a first command to a database service to initiate a graceful database switchover from the first fault domain to the second fault domain.

15. The system of claim 14, wherein the output corresponds to an elapsed time for the graceful database switchover, wherein the threshold corresponds to a time threshold, and wherein to cause the second recovery action to occur with respect to the first server, additional computer-executable instructions configure the computer hardware processor to at least:

send a second command to the database service to initiate an ungraceful database failover from the first fault domain to the second fault domain.

16. The system of claim 14, wherein the plurality of steps comprises a second step for database validation, wherein to execute the recovery plan, additional computer-executable instructions configure the computer hardware processor to at least:

invoke a database validation script for execution on a database server within the second fault domain.

17. The system of claim 13, wherein the plurality of steps comprises a second step for a domain name service change, wherein to execute the recovery plan, further computer-executable instructions configure the computer hardware processor to at least:

send a command to a domain name service, wherein the command causes the domain name service to redirect a request from the first fault domain to the second fault domain.

18. The system of claim 13, wherein the first recovery configuration comprises a first threshold capacity, wherein to cause the first recovery action to occur, further computer-executable instructions configure the computer hardware processor to at least:

send, based on the first recovery configuration, a first command to a computing platform scaling service to add processing capacity in a computing platform.

19. The system of claim 18, wherein the output corresponds to a capacity level of the second fault domain, wherein the threshold corresponds to a capacity threshold, and wherein to cause the second recovery action to occur with respect to the first server, additional computer-executable instructions configure the computer hardware processor to at least:

determine a second recovery configuration that corresponds to a second threshold capacity different from the first threshold capacity; and send, based on the second recovery configuration, a second command to the computing platform scaling service to satisfy the second threshold capacity.

20. The system of claim 13, wherein to execute the recovery plan, further computer-executable instructions configure the computer hardware processor to at least:

determine a health status of the particular fault domain; and select, based on the health status, the particular fault domain from a plurality of fault domains for the first recovery action to occur.

* * * * *